United States Patent [19]
Gajecki

[11] Patent Number: 4,508,995
[45] Date of Patent: Apr. 2, 1985

[54] METHOD OF ELIMINATING DISCOMFORTING FLICKERING WHEN VIEWING X-RAY FILM IN A LIGHT CABINET, AND A FLICKER-ELIMINATING UNIT FOR USE IN A LIGHT CABINET

[75] Inventor: Rickard Gajecki, Lidingö, Sweden

[73] Assignee: AO:s Metall & Mek. Verkstad AB, Stockholm, Sweden

[21] Appl. No.: 359,669

[22] PCT Filed: Jun. 26, 1981

[86] PCT No.: PCT/SE81/00190
§ 371 Date: Mar. 10, 1982
§ 102(e) Date: Mar. 10, 1982

[87] PCT Pub. No.: WO82/00367
PCT Pub. Date: Feb. 4, 1982

[30] Foreign Application Priority Data
Jul. 18, 1980 [SE] Sweden ................... 8005271

[51] Int. Cl.³ ............... H05B 37/02; H05B 39/04; H05B 41/36
[52] U.S. Cl. ................... 315/209 R; 315/306; 315/307; 315/311; 315/DIG. 7; 378/91

[58] Field of Search ............... 315/306, 307, 308, 309, 315/310, 311, 312, DIG. 5, DIG. 7, 209 R; 378/91

[56] References Cited
U.S. PATENT DOCUMENTS 3,969,652  7/1976  Herzog ........................ 315/308
3,999,100  12/1976 Dendy et al. ............. 315/DIG. 5
4,042,856  8/1977  Steigerwald ................ 315/307
4,170,746  10/1979 Davenport ............... 315/DIG. 7
4,240,009  12/1980 Paul .......................... 315/307
4,277,728  7/1981  Stevens ...................... 315/307
4,378,513  3/1983  Yoshikawa et al. ...... 315/DIG. 7
4,388,562  6/1983  Josephson .............. 315/DIG. 5

FOREIGN PATENT DOCUMENTS
2335589  1/1974  Fed. Rep. of Germany .
2948288  8/1980  Fed. Rep. of Germany .

Primary Examiner—Saxfield Chatmon
Attorney, Agent, or Firm—Fleit, Jacobson, Cohn & Price

[57] ABSTRACT

A method of eliminating discomforting flickering when viewing X-ray films in a light cabinet using fluorescent lamps, and a flicker-eliminating circuit for use in the light cabinet.

6 Claims, 1 Drawing Figure

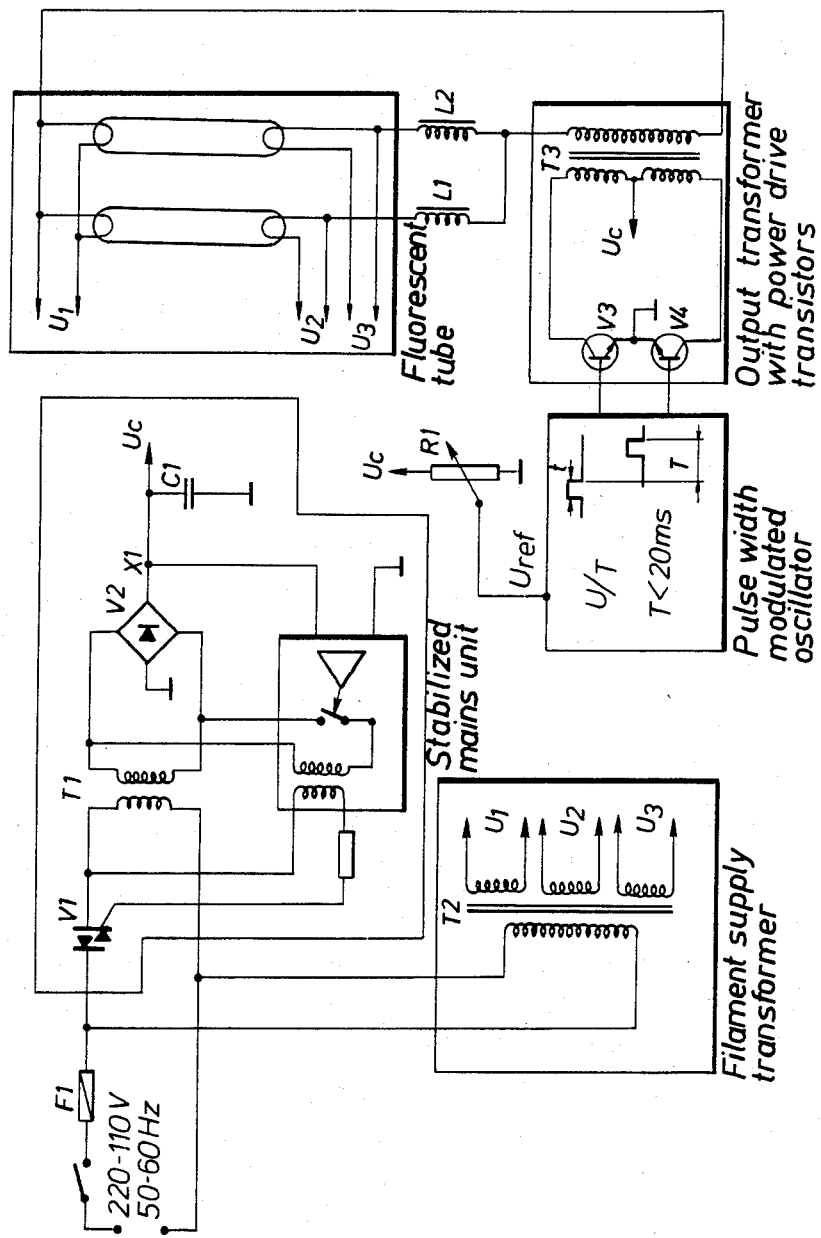

METHOD OF ELIMINATING DISCOMFORTING FLICKERING WHEN VIEWING X-RAY FILM IN A LIGHT CABINET, AND A FLICKER-ELIMINATING UNIT FOR USE IN A LIGHT CABINET

TECHNICAL FIELD

Personnel working with X-ray film viewing cabinets often complain of tiredness and headaches, resulting from flickering light emitted by the flourescent strip lighting with which the X-ray pictures are illuminated. This is noticed most when examining underexposed parts of X-ray film, where it is necessary to decrease the light strength in order to obtain the requisite contrasting effect. In this case, flickering becomes troublesome after only a short time.

One serious, indirect disadvantage with flickering of the flourescent tubes, is that the X-ray technician or the doctor is often unable to make a positive diagnosis on the basis of an existing X-ray picture, and hence it is necessary to take a new picture, with the patient being subjected to a further dose of X-rays as a result thereof.

OBJECT OF INVENTION

The present invention relates to a method of eliminating the flickering of fluorescent tubes in X-ray cabinets with the aid of simple means, thereby eliminating the aforementioned serious disadvantages.

BRIEF SUMMARY OF INVENTION

According to one aspect the invention resides in a method of eliminating discomforting flickering when examining X-ray film in a light cabinet with fluorescent strip lighting supplied with mains voltage via thermionic transformers, for regulating the light intensity. The method is mainly characterized by stabilizing and rectifying the mains voltage, and by energizing the fluorescent tubes subsequent to increasing the frequency to at least twice the mains frequency, suitably to at least 10 kHz and preferably at least 20 kHz. By increasing the frequency of the lighting supply voltage, flickering is reduced or eliminated, which is advantageous, particularly when the light intensity of the lighting is reduced so as to enable underexposed parts of X-ray films to be examined.

A clear and, in many cases, acceptable effect can be obtained by increasing said frequency to approximately twice that of the mains frequency, i.e. to about 100–120 Hz. A fully satisfactory effect is normally obtained, however, when the frequency reaches about 10 kHz. The higher the frequency, the lower the risk of the human ear discerning generated sound oscillations, which risk is considered to be substantially non-existant at frequencies above 20 kHz. Because of this, and for other reasons, a frequency of this order of magnitude is preferred. In addition hereto, a completely flicker-free light is obtained from fluorescent lighting at such frequencies, irrespective of the light intensity.

According to a preferred embodiment of the invention, the increase in frequency is effected by means of an oscillator which co-oscillates with one or more power drive transistors for supplying the primary side of an output transformer whose secondary side delivers a voltage which corresponds to the nominal mains voltage and which is applied to the fluorescent tubes via current-limiting chokes.

These cokes impede the current in accordance with current specifications for existing fluorescent tubes. Chokes intended for frequencies of from 20–25 kHz are considerably smaller in size and cheaper in price than the present day conventional chokes for frequencies of 50 Hz.

The utilization of a pulse width modulated oscillator enables the light intensity of the fluorescent tube to be readily regulated via a variable resistance.

According to a further embodiment of the invention, the mains voltage is stabilized prior to rectification via a transformer, by registering on the secondary side of the transformer any deviation from the nominal mains voltage, and correcting said deviations by switching a bidirectional thyristor arranged on the primary side of the transformer. In this way the mains voltage is stabilized reliably, which is necessary if the subsequent rectification and increase in frequency is to lead to the desired result.

According to a second aspect, the invention relates to a flicker-eliminating arrangement for a light cabinet having fluorescent tubes supplied with mains voltage via a filament transformer, for regulating the light intensity, the main features of said arrangement being set forth in the following claims.

An arrangement according to the invention can either be installed in X-ray film light cabinets during the manufacture of said cabinets, or can be installed in existing cabinets, thereby enabling the aforementioned serious occupational hazards represented by the flickering of fluorescent tubes provided in said cabinets to be effectively eliminated in a simple and inexpensive fashion.

BRIEF DESCRIPTION OF DRAWING FIGURE

An exemplary embodiment of the invention will now be described in more detail with reference to the circuit diagram illustrated in the single FIGURE of the drawing accompanying this specification.

DESCRIPTION OF PREFERRED EMBODIMENT

As shown in the drawing, the arrangement, which is intended to be mounted in an X-ray examining light cabinet, comprises five major parts, these being a voltage-stabilized mains unit, a filament transformer, an oscillator, an output transformer with power drive transistors, and fluorescent tubing belonging to the cabinet.

The stabilized mains unit is connected to the mains via a fuse F1, to stabilize the mains voltage via a transformer T1. The mains voltage is stabilized by means of bridge-coupled diodes V2, and is filtered by means of a capacitor C1, so as to obtain a smooth, non-pulsing d.c. voltage $U_c$.

The loaded voltage is measured at X1, and any deviation from the rated voltage is corrected by switching a bidirectional thyristor ("triac") V1.

As a result of stabilizing and rectifying the mains voltage, the voltage of the fluorescent tube is not affected by any other load on the mains network, or by unreliable mains qualities in general resulting an impure mains voltage sine curve.

The filament transformer T2 is connected to the mains network via the fuse F1 and provides voltage to both electrodes of the fluorescent tube. As a rule this voltage is low and may, for example, be 4 volts. This enables the light to be controlled or regulated in a known manner, for example by pulse width modulation.

The output transformer having the power drive transistors V3 and V4 provide the fluorescent tubes with a.c. voltage, via chokes L1 and L2, having a frequency which is higher than about twice the frequency of the mains voltage and which preferably reaches 20 kHz or more, said chokes being arranged to limit the current for present day types of fluorescent tubes in accordance with current specifications. The output transformer T3 transforms the voltage to a value corresponding to the nominal or rated mains voltage.

The oscillator which is shown as a pulse-width modulated oscillator in the sole FIGURE switches the transistors V3 and V4 with given frequency. If this frequency reaches 20–25 kHz, frequencies audible to the human ear are eliminated, which is of particular advantage when there is no mechanical insulation.

As beforementioned, the light intensity of the fluorescent tubes can be varied by pulse-width modulation, which is regulated via the variable resistance R1.

Normally, a conventional light cabinet includes the fuse F1, the transformer T2 and one or more fluorescent tubes. Current is supplied directly from the mains network, via suitable chokes.

Thus, in accordance with a preferred embodiment of the invention other components illustrated in the drawing are included in the component arrangement which according to one aspect of the invention can be used to convert a conventional light cabinet in which the tubes are likely to flicker into a light cabinet in which flickering will not occur.

INDUSTRIAL APPLICABILITY

The component arrangement can be readily installed. Thus, it is normally only necessary to sever four of the electrical conductors of the electrical system of a conventional light cabinet and connect thereto a component arrangement or unit according to the invention, said unit having connecting means which correspond in number to the number of severed conductors. No complicated reconstruction of the actual light cabinet is required; neither is it necessary as a rule to change the manner in which the conductors are arranged and drawn.

It will be obvious to one of normal skill in this art that the frequency can be increased in a different way to that described. Thus, the described and illustrated embodiment is only to be considered an example of the invention, which can be modified in many ways within the scope of the following claims.

I claim:

1. A method of eliminating discomforting flickering when viewing an under-exposed portion of X-ray film in a light cabinet having fluorescent tube means supplied with alternating current mains voltage of a given frequency via a filament transformer, and for regulating the light intensity, said method comprising the steps of:
   stabilizing and rectifying the mains voltage to obtain a substantially smooth and non-pulsing d.c. voltage;
   viewing said underexposed portion of said X-ray film;
   generating a nominal voltage having a predetermined frequency determined by:
   setting a level of voltage utilizing said d.c. voltage to reduce flickering of said fluorescent tube means while viewing said X-ray film;
   generating pulse-width signals wherein the pulse width and the magnitude thereof are determined by said level of voltage;
   transforming said pulse-width signals into said nominal voltage such that said predetermined frequency corresponds to said pulse width of said pulse-width signals;
   choking said nominal voltage having said predetermined frequency to impede the current in accordance with the current requirements for said fluorescent tube means,
   applying the choked nominal voltage to said fluorescent tube means.

2. A method according to claim 1, wherein the step of generating pulse-width signals is accomplished by the co-oscillation of power drive transistors in dependence upon said level of voltage.

3. A method according to claim 1 or claim 2, wherein the mains voltage is stabilized by registering deviations thereof and subsequently correcting any deviation by switching 4. A flicker-eliminating component arrangement for an X-ray viewing light cabinet having fluorescent tube means having an operating current supplied with alternating current mains voltage of a given frequency via a filament transformer, for regulating the light intensity and viewing an underexposed portion of an X-ray film, said arrangement comprising:
   stabilizing means for stabilizing and filtering the mains voltage;
   means for rectifying the stabilized and filtered mains voltage to produce a substantially smooth d.c. voltage;
   means for viewing said underexposed portion of said X-ray film;
   circuit means for generating a nominal voltage having a predetermined frequency including:
   means for setting a level of voltage utilizing said d.c. voltage to reduce flickering of said fluorescent tube means while viewing said X-ray film;
   means for generating pulse-width signals wherein the pulse width and the magnitude thereof are determined by said level of voltage;
   transformer means supplied with said pulse-width signals, said transformer means generating said nominal voltage such that said predetermined frequency of said nominal voltage corresponds to said pulse width of said pulse-width signals;
   current-limiting means connected between said circuit means and said fluorescent tube means for limiting current supplied thereto.

5. A component arrangement according to claim 4, wherein said circuit means comprises an oscillator arranged to co-oscillate, via power drive transistors, with the primary side of an output transformer, said power drive transistors generating pulse-width signals in accordance with said level of voltage supplied to said oscillator, said transformer arranged to transform the voltage to said nominal voltage, and the output side of said transformer being connected to the current-limiting means.

6. A component arrangement according to claim 4 or claim 5, wherein the stabilizing means comprises means for registering deviations from said nominal mains voltage on the secondary side of an input transformer and means for correcting said deviations by switching a bidirectional thyristor located on the primary side of the input transformer.

* * * * *